United States Patent [19]
Heintzeman

[11] Patent Number: 5,597,023
[45] Date of Patent: Jan. 28, 1997

[54] TABLE SAW TENONIZER JIG

[76] Inventor: Michael G. Heintzeman, 8200 Semmler Rd., Nisswa, Minn. 56468

[21] Appl. No.: 555,004

[22] Filed: Nov. 9, 1995

Related U.S. Application Data

[63] Continuation of Ser. No. 994,529, Dec. 21, 1992, abandoned.

[51] Int. Cl.$^6$ .................................................. B23Q 3/00
[52] U.S. Cl. ........................ 144/204.2; 82/115; 83/432; 83/860; 83/468.7; 142/26; 142/48; 144/205; 144/363; 144/2.1; 144/198.1; 144/251.1; 269/50
[58] Field of Search ........................... 82/1.11, 113, 115, 82/173; 83/379, 379.1, 398, 409, 412, 431, 432, 467.1, 468.7, 860; 142/1, 26, 48, 55, 87; 144/2 R, 198 R, 198 A, 203, 204, 205, 251 R, 363, 365; 269/47, 48, 50

[56] References Cited

U.S. PATENT DOCUMENTS

| | | | |
|---|---|---|---|
| 2,777,485 | 1/1957 | Farrow | 144/198 A |
| 4,732,182 | 3/1988 | Gorsha | 144/198 A |
| 4,899,795 | 2/1990 | Hackett | 144/198 A |
| 5,020,578 | 6/1991 | Jennings | 144/198 A |
| 5,065,802 | 11/1991 | Peterson | 144/198 A |

*Primary Examiner*—W. Donald Bray
*Attorney, Agent, or Firm*—Rick Martin

[57] ABSTRACT

The present invention consists of a main frame that mounts atop a table saw. An axis shaft on a rocker assembly holds a wooden workpiece which is rotated and lowered into the circular cutting blade. Either a radius or square shoulder tenon can be cut depending on the orientation of the axis shaft.

12 Claims, 6 Drawing Sheets

TABLE SAW TENONIZER JIG

CROSS REFERENCE PATENTS

The present application is a continuing application of U.S. patent application Ser. No. 07/994,529, filed Dec. 21, 1992, now abandoned.

FIELD OF INVENTION

The present invention relates to woodworking apparatus for use with a conventional table saw. More particularly the present invention relates to a device for accurately and safely forming tenons in wood.

BACKGROUND OF THE INVENTION

Traditionally tenon cutting for mortise and tenon fabrication has been a slow and tedious process, with the difficulty of cutting an accurate tenon increasing as you move away from machined material on which the tenon is to be cut.

The prior art discloses three basic approaches to producing circular tenons and their corresponding circular mortises. Hole saws, chucking machines having tenon bits, and lathes having either conventional or multi-cutter powered cutter heads are known in the prior art.

The present invention solves problems present in the prior art. The present invention may be used with any wood shape including irregularly shaped wood. The present invention produces tenons of variable size. The present invention is accurate within 1/32 of an inch and will produce a medium size tenon in less than 60 seconds.

SUMMARY OF THE INVENTION

The primary object of the present invention is to provide a device for use with a table saw to produce tenons in wood.

Another object of the present invention is to provide a device for safely and accurately maintaining a piece of wood in the proper orientation during the tenon making process.

Another object of the present invention is to provide a device producing tenons of variable size.

Another object of the present invention is to provide a device for producing tenons in irregularly shaped wood.

Another object of the present invention is to improve the speed of producing tenons in wood.

Another object of the present invention is to provide a device for use with a table saw that will produce tenons with an accuracy within 1/32 of an inch.

The present invention consists of a main frame that is fastened to the top of said table saw. To the main frame are mounted two bearings holding a rocker assembly consisting of two depth stop adjustment bolts with their accompanying mounts and an axis shaft. The axis shaft holds the wooden workpiece in position to have a tenon cut on it and carries it through the tenon cutting process. The axis shaft is the single mechanical support of the wooden workpiece on which the tenon is cut, and becomes the axis and the sliding bearing of material.

The design and action of the present invention allows for the tenon to be variable in size, from one inch to six inches in diameter, and from one-fourth inch to two and one half inches in length. A longer tenon may be produced by removing the five inch long axis shaft pin and installing a longer axis shaft pin. A drilling jig is used with the present invention to accurately bore the one-half inch by five an one-half inch deep hole in the end of wooden material to be placed on the tenonizer jig. The drilling jig is designed so that a hole is drilled in each end of material, effectively "line boring" a piece. "Line bored" in this context is defined as partially drilling a whole in each end of the workpiece as if the hole went all the way, straight through the material.

Length capabilities of the present invention are from one foot to eight feet. Any shape of wood within the one to eight foot limit may have tenon cut on it. Round, square, rectangle, or even split logs for rail fencing may be tenonized by the present invention.

Other objects of this invention will appear from the following description and appended claims, reference being had to the accompanying drawings forming a part of this specification wherein like reference characters designate corresponding parts in the several views.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DESCRIPTION OF THE PREFERRED EMBODIMENT

Figure 1:
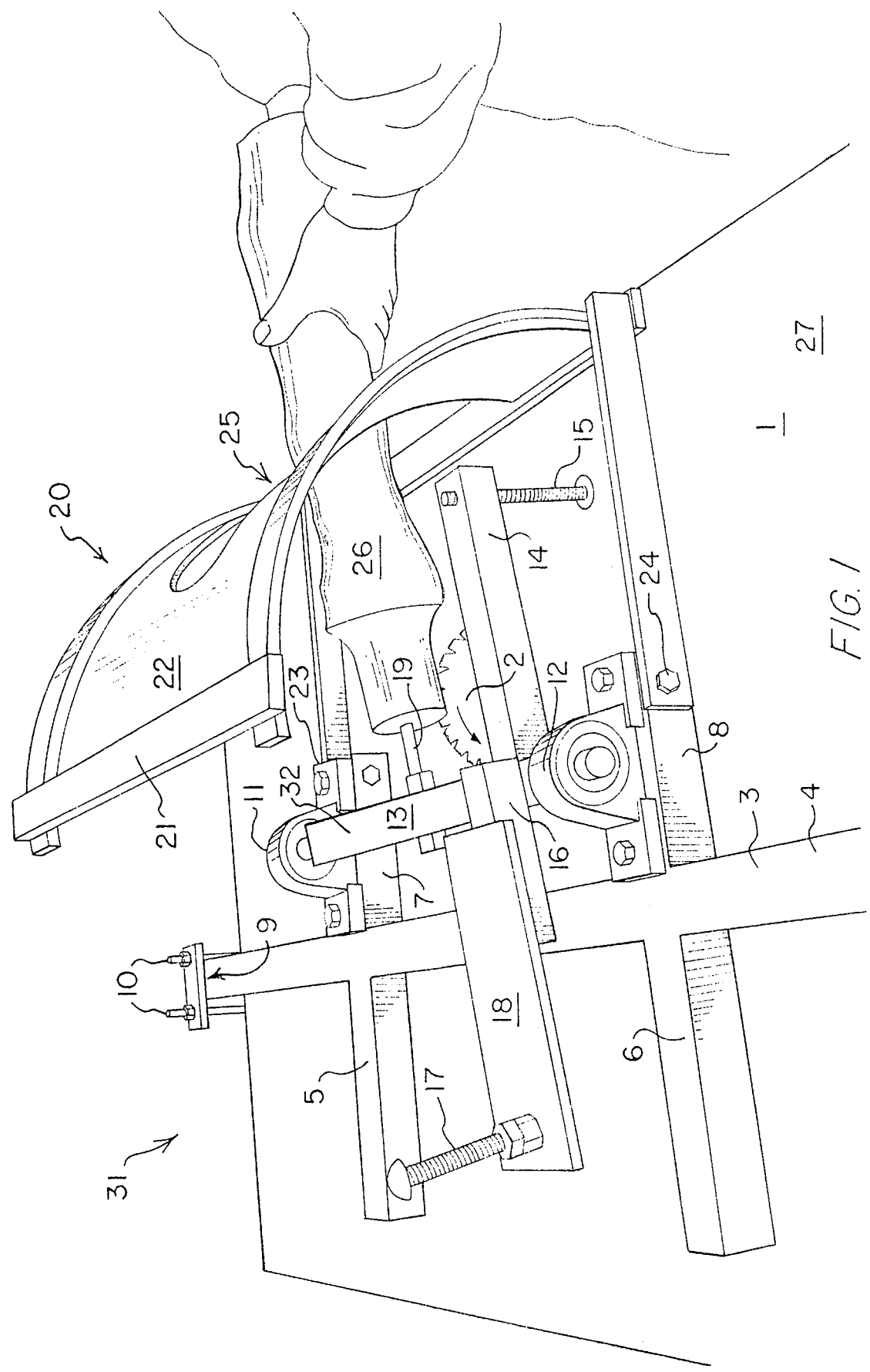
FIG. 1 is a top perspective view of the present invention.
Figure 2:
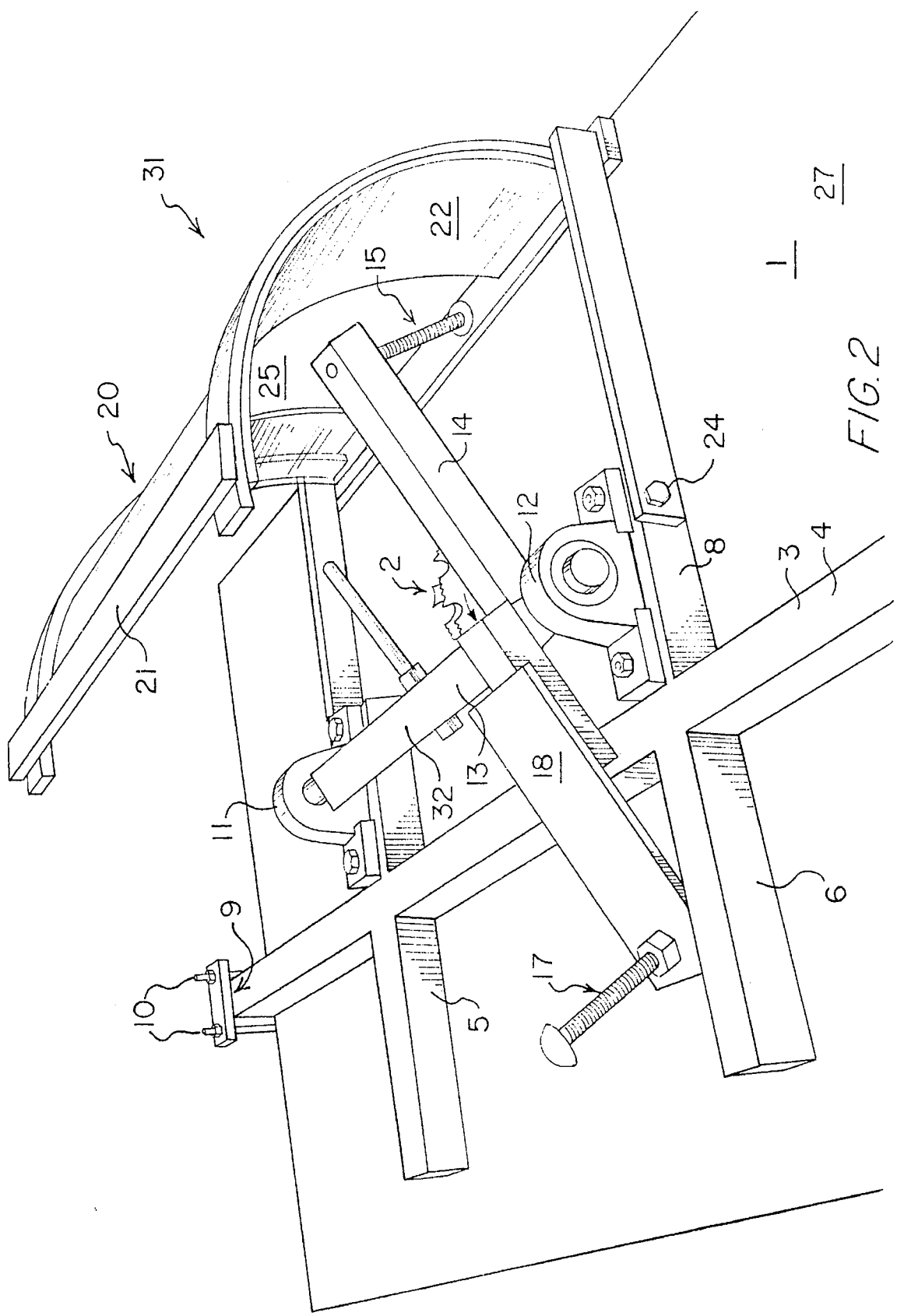
FIG. 2 is a top perspective view of the present invention in the "load" position.
Figure 3:
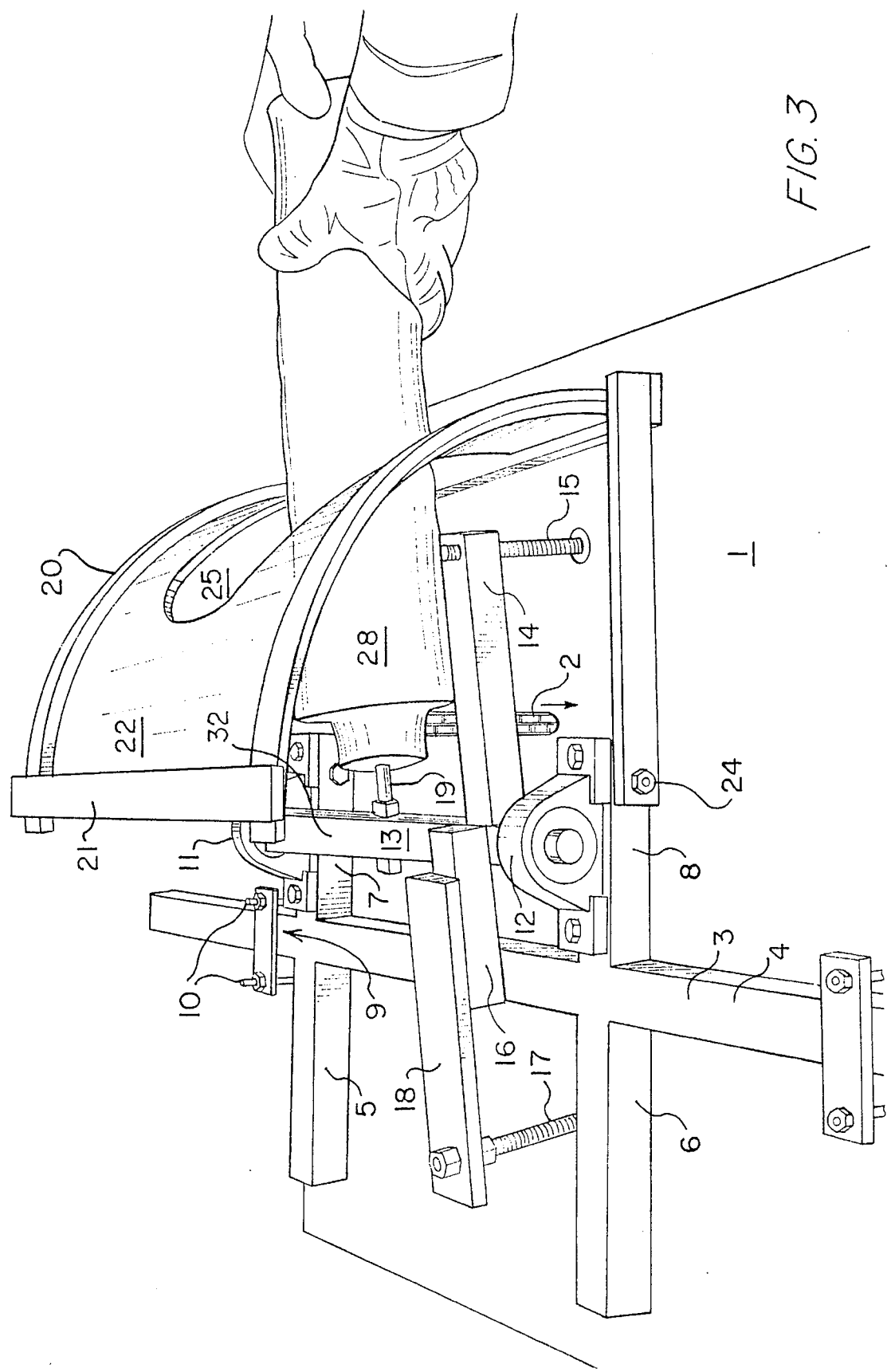
FIG. 3 is a top perspective view of the present invention engaging a piece of wood to produce a square shoulder tenon.

Referring first to FIG. 1, the present invention 31 mounted on a conventional table saw is shown. The table saw 1 is equipped with a dado blade 2. The table saw 1 is set at zero degrees so that the circumference of the dado blade 2 is at a 90° angle to the planar surface of the table saw 1. The present invention 31 is mounted above the blade 2 of the table saw 1.

Figure 4:
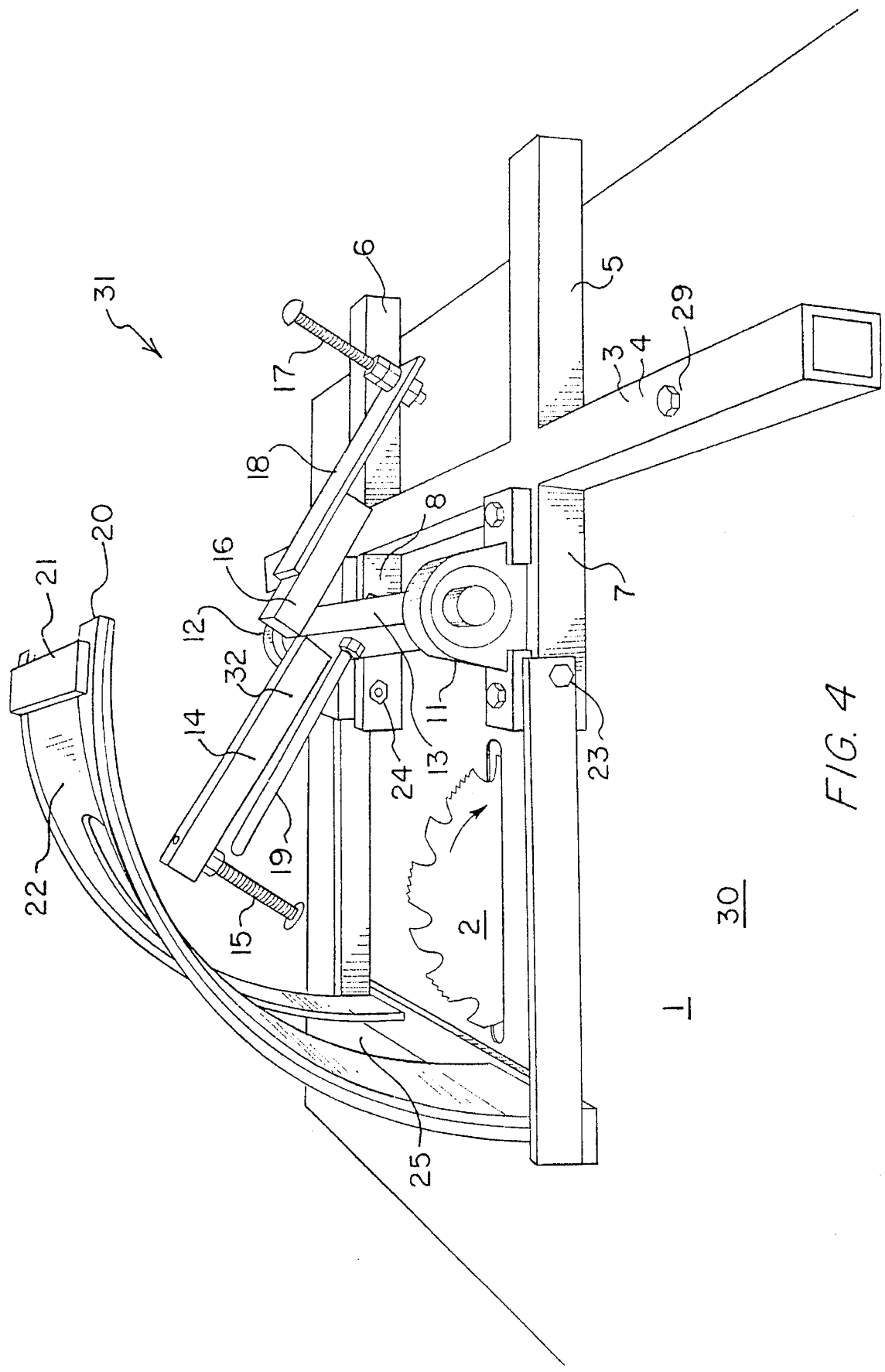
FIG. 4 is a top perspective view of the present invention.
Figure 5:
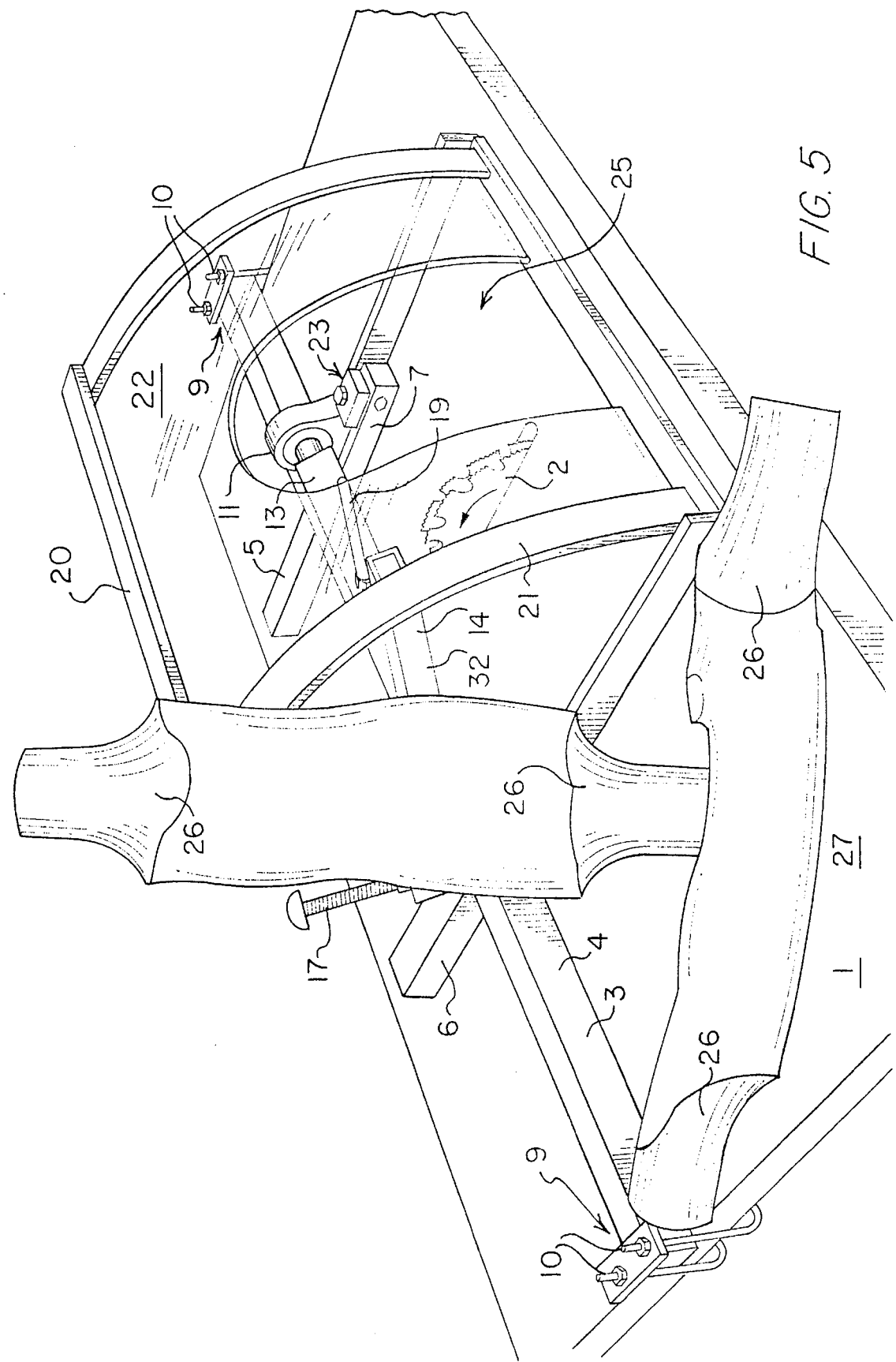
FIG. 5 is a top perspective view of the present invention showing the material access cutout.
Figure 6:
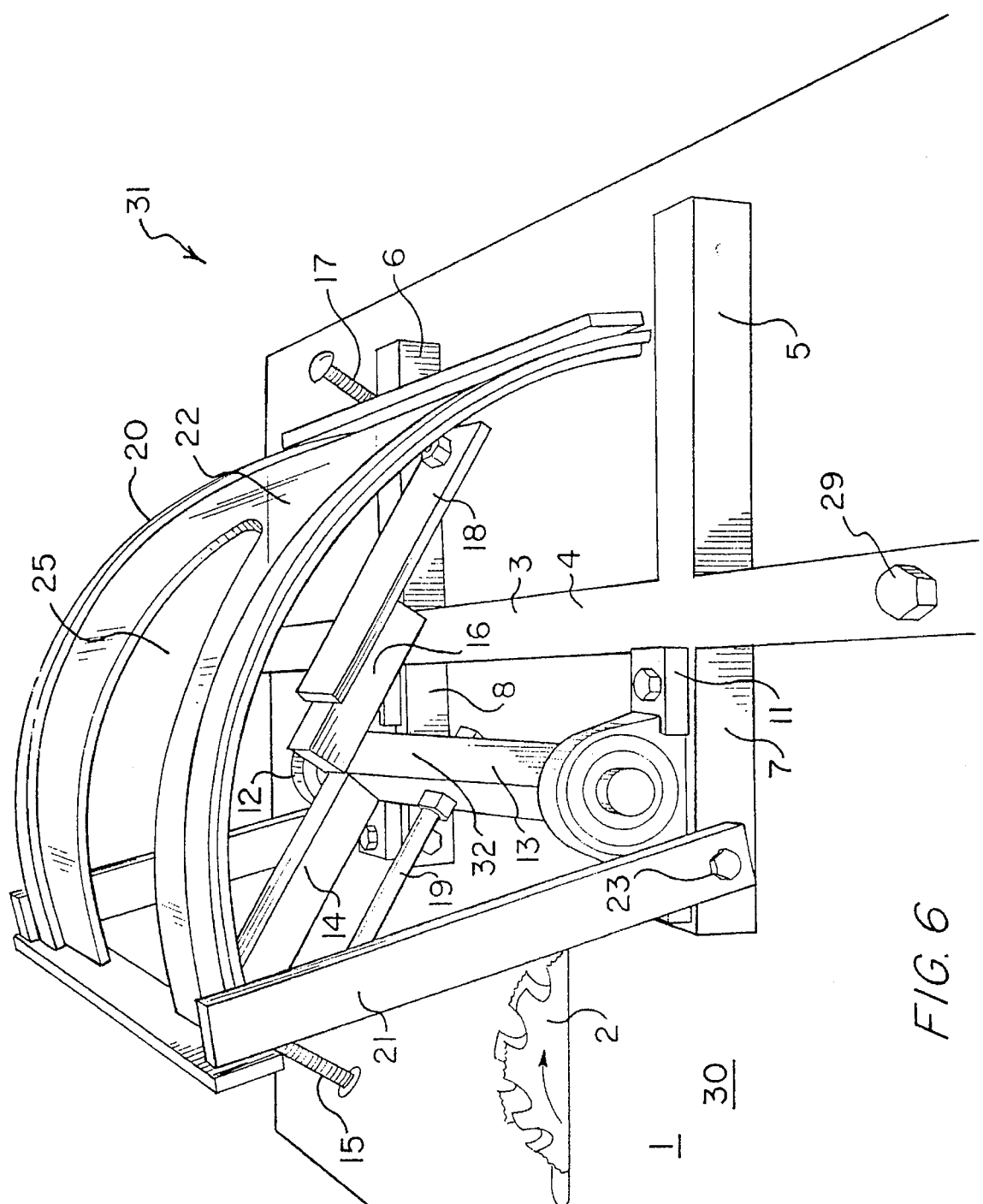
FIG. 6 is a top perspective view of the present invention having the safety shield raised.

The present invention 31 comprises a main frame 3, with an elongated bar 4. The elongated bar 4 is clamped, bolted, or fastened to the table saw 1. The elongated bar 4 can be directly attached to the table saw 1 via bolts 29 as shown in FIG. 4. Alternatively, the elongated bar 4 may be attached to the table saw 1 using mounting plates 9 in conjunction with J bolts 10. The J bolts 10 hook the bottom edge of the table saw top extension through the mounting plates and are then secured into position.

A right stabilizing arm 5 and left stabilizing arm 6 are attached to the rear of the elongated bar 4 to stabilize and support the present invention 31. A right bearing mount arm 7 and left bearing mount arm 8 are attached to the front of the elongated bar 4, whereby the dado blade 2 is disposed between the two bearing arms 7, 8. The rocker assembly central shaft 13 is held in position on the right and left bearing arms 7, 8 by right and left bearings 11, 12.

Two outrigger arms 14, 16 are fixed to the central shaft 13 of the rocker assembly 32. The forward outrigger arm 14 is attached to the front end of the central shaft 13. The forward outrigger arm 14 comprises a depth stop adjustment bolt 15. A counter balance 18 is attached to the rearward outrigger arm 16. The counter balance 18 further comprises a rearward depth stop adjustment bolt 17.

An interchangeable axis shaft 19 is attached to the center of the central shaft 13 of the rocker assembly 32. The axis shaft holds the wood stock in place during the tenonizing process. The axis shaft 19 may be interchanged to produce tenons of varying length. The resulting tenon will be ½ the length of the axis shaft. In the present invention the axis shaft 19 is constructed of a steel shaft ½ inch in diameter and 5 or 7 inches in length.

Critical to the safety of the operator is the protective shield 20. This consists of a protective shield framework 21 and a transparent shield 22 with its accompanying material access cutout 25. This protective shield 20 also hinges back thereby facilitating cleaning, and giving access to the dado blade 2 and the forward depth stop adjustment bolt 15. The right hinge 23 and left hinge 24 of the protective shield 20 are fastened to the forward right and left bearing mount arms 7, 8 of the main frame 3.

The safety shield 20 is constructed of a tough plastic such as Lexan® for strength and durability. The safety shield framework is all welded construction of ⅜"×1 ¼" solid stock.

An 88 ½° right and 4° up compound angle of the axis shaft 19 to the dado blade 2 produces a perfectly flat square shoulder tenon. An 87° right, 6° up compound angle will produce a slightly concave bottom. Increasing the angle "up" will produce a slightly concave square shoulder tenon. Decreasing the angle will produce a slightly convex square shoulder tenon.

The tenon width is adjusted by lowering and raising the dado blade 2.

Although the present invention has been described with reference to preferred embodiments, numerous modifications and variations can be made and still the result will come within the scope of the invention. No limitation with respect to the specific embodiments disclosed herein is intended or should be inferred.

I claim:

1. In combination with a table saw having a table top and a rotating dado blade with a perimeter cutting edge, a device for cutting a tenon into the end of an elongated wood stock, the device comprising:

a main frame removably fastened to the table top;

a rocker assembly affixed to said main frame, functioning to enable the rotation of a central shaft in an arc over the table top;

said rocker assembly further comprising an axis shaft mounted perpendicular to the central shaft, functioning to support the wood stock along a hole in the longitudinal axis of one end of the wood stock; and said rocker assembly further comprising means for predetermining an arc of rotation of the central shaft and axis shaft, whereby a tenon is cut into the wood stock at the end mounted on the axis shaft when the wood stock is rotated around the axis shaft and into the perimeter cutting edge of the dado blade within the predetermined arc of rotation of the axis shaft.

2. The device of claim 1, wherein said means for predetermining the arc of rotation further comprises an outrigger arm extending from said rocker assembly, said outrigger arm having an adjustable stopper means to stop the outrigger arm at a preset arc of rotation.

3. The device of claim 2 wherein said adjustable stopper means further comprises a bolt having an end contacting the table top.

4. The device of claim 1 wherein said axis shaft further comprises a parallel alignment relative to said dado blade, functioning to cut a radius shoulder tenon in the wood stock.

5. The device of claim 1, wherein said axis shaft further comprises a perpendicular alignment relative to said dado blade, functioning to cut a square shoulder tenon in the wood stock.

6. A tenonizer assembly removably fastened to a table saw top, said table saw top having a circular cutter mounted at a 90° angle to the table saw top, said tensioner assembly comprising:

a main frame having an elongated bar removably fastened to the table saw top;

said elongated bar further comprising a plurality of stabilizing arms and bearing mounting arms;

a rocker assembly having a central shaft, forward and rearward outrigger arms and a depth adjustment means functioning to provide a predetermined tenon diameter;

said rocker assembly attaching at said central shaft to said bearing mounting arms of said elongated bar of said mainframe, functioning to allow rotation of said central shaft above said table top; and an axis shaft projecting from said rocker assembly above said circular cutter, functioning in conjunction with said central shaft to support and rotate a wood stock having an axial bore therein in a predetermined position in relation to said circular cutter.

7. The tenonizer assembly of claim 6, wherein said axis shaft is interchangeable with a plurality of axis shafts of differing sizes, whereby said table saw tenonizer is capable of tenonizing a predetermined array of wood stock sizes.

8. The tenonizer assembly of claim 7, wherein said predetermined position of said wood stock is parallel to said circular cutter of said table saw functioning to cut a radius shoulder tenon in said wood stock.

9. The tenonizer assembly of claim 7, wherein said predetermined position of said wood stock is perpendicular to said circular cutter of said table saw functioning to cut a square shoulder tenon in said wood stock.

10. The tenonizer assembly of claim 7 further comprising a protective shield fastened to the main frame functioning to protect a worker from inadvertent contact with said circular cutter and having an opening through which to receive said wood stock.

11. The tenonizer assembly of claim 10, wherein said protective shield further comprises a hinge functioning to allow access to the circular cutter and said axis shaft.

12. The tenonizer assembly of claim 6, wherein said depth adjustment means further comprises a bolt.

\* \* \* \* \*